United States Patent
Afonso

(10) Patent No.: US 9,943,147 B2
(45) Date of Patent: Apr. 17, 2018

(54) BEACH UMBRELLA WITH A TRANSPARENT OR TRANSLUCENT FILM CANOPY WHICH ALLOWS SUNLIGHT TO PASS BUT FILTERS OUT ULTRAVIOLET RAYS

(71) Applicant: SERNIS-FORMAÇÃO E SOLUÇÕES TECNOLÓGICAS, LDA, Braga (PT)

(72) Inventor: Fernando João Gonçalves Afonso, Braga (PT)

(73) Assignee: SERNIS-FORMAÇÃO E SOLUÇÕES TECNOLÓGICAS, LDA, Braga (PT)

(*) Notice: Subject to any disclaimer, the term of this patent is extended or adjusted under 35 U.S.C. 154(b) by 282 days.

(21) Appl. No.: 14/843,910

(22) Filed: Sep. 2, 2015

(65) Prior Publication Data

US 2016/0029753 A1   Feb. 4, 2016

Related U.S. Application Data

(63) Continuation-in-part of application No. 14/060,580, filed on Oct. 22, 2013, now abandoned.

(51) Int. Cl.
| | | |
|---|---|---|
| *A45B 25/18* | (2006.01) | |
| *B32B 27/18* | (2006.01) | |
| *B32B 27/08* | (2006.01) | |
| *B32B 27/30* | (2006.01) | |

(52) U.S. Cl.
CPC ............. *A45B 25/18* (2013.01); *B32B 27/08* (2013.01); *B32B 27/18* (2013.01); *B32B 27/306* (2013.01); *A45B 2025/183* (2013.01); *B32B 2250/03* (2013.01); *B32B 2307/412* (2013.01); *B32B 2307/414* (2013.01); *B32B 2307/71* (2013.01); *Y10T 428/3192* (2015.04)

(58) Field of Classification Search
None
See application file for complete search history.

(56) References Cited

U.S. PATENT DOCUMENTS

| | | | |
|---|---|---|---|
| 4,524,099 A | 6/1985 | Di Luccio | |
| 5,643,676 A * | 7/1997 | Dobashi | ............. C09J 7/02 428/343 |
| 7,503,336 B2 * | 3/2009 | Labarbera | ............. A45B 25/18 135/16 |
| 2011/0303277 A1 | 12/2011 | Neumann et al. | |

* cited by examiner

*Primary Examiner* — Sheeba Ahmed
(74) *Attorney, Agent, or Firm* — John Alumit

(57) ABSTRACT

This invention relates to a type of sunshade that has the distinctive feature of allowing sunlight and heat to pass, but prevents the passage of ultraviolet rays. The device, of conventional configuration, has a film consisting of three layers. Each layer consists of copolymers. Additives are added to these layers to absorb and stabilize ultraviolet rays. The invention allows the user, at the beach for example, to sunbathe and feel its warmth, while being protected from the damaging effects of ultraviolet rays.

1 Claim, 3 Drawing Sheets

BEACH UMBRELLA WITH A TRANSPARENT OR TRANSLUCENT FILM CANOPY WHICH ALLOWS SUNLIGHT TO PASS BUT FILTERS OUT ULTRAVIOLET RAYS

CROSS-REFERENCE TO RELATED APPLICATION

This application is a continuation-in-part application of U.S. patent application Ser. No. 14/060,580, filed on Oct. 22, 2013, which is currently pending.

FEDERALLY SPONSORED RESEARCH

Not Applicable

SEQUENCE LISTING OR PROGRAM

Not Applicable

BACKGROUND

This is a sunshade device that has the distinctive feature of allowing almost all of the sunlight to pass through, but blocks most of the ultraviolet rays.

Almost paradoxically, it is not a sunshade in the technical sense. In fact, the invention does not block the sun in the sense of producing a shadow. The practical use of the invention lies in the fact that its user can be on the beach, enjoy "sun bathing", and feel the warmth without being subject to harmful ultraviolet rays.

The invention uses a sheet of film, which would take the place of typical fabric used in conventional beach umbrellas (sunshades). The invention is made up of several layers that would incorporate substances known to filter or absorb ultraviolet rays.

Essentially, it is the application of a film, instead of fabric, to a beach umbrella's conventional structure at the manufacturing phase. A transparent or translucent film capable of absorbing ultraviolet rays and preventing them from reaching whomever is under its protection, thereby allowing its user to enjoy the sun's warmth.

Films for filtering ultraviolet and other types of radiation are already well known. The inventor has absolutely no knowledge of any type of transparent or translucent film with radiation-filtering, or radiation-absorption, features applied to a conventional sunshade in lieu of fabric, thereby allowing sunlight and heat to pass through but preventing harmful radiation from passing.

Naturally, this technique recognizes that there are similar devices that use plastic film. Moreover, they have the same transparency characteristic. These are ordinary umbrellas. They have, of course, none of the features related to protection against any kind of solar radiation.

SUMMARY

This invention relates to a type of sunshade that has the distinctive feature of allowing sunlight and heat to pass, but prevents the passage of ultraviolet rays. The device, of conventional configuration, has a film consisting of three layers. Each layer consists of copolymers. Additives are added to these layers to absorb and stabilize ultraviolet rays. The invention allows the user, at the beach for example, to sunbathe and feel its warmth, while being protected from the damaging effects of ultraviolet rays.

BRIEF DESCRIPTION OF THE INVENTION

Figure 2:
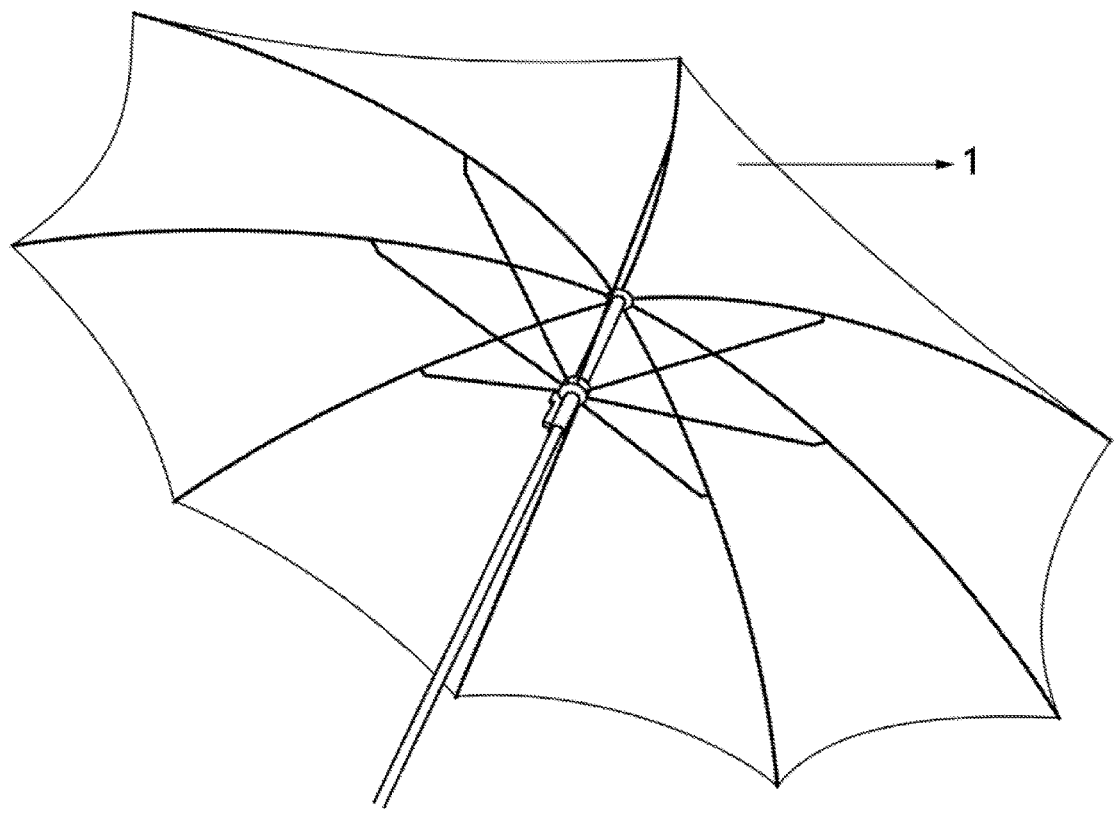
FIG. 2 depicts the structure of a conventional sunshade, with the film (1) already applied.

The invention starts with a conventional umbrella structure (FIG. 2). However, instead of using fabric during the manufacturing stage to perform its traditional function—providing shade—the cover consists of a transparent or translucent film (1).

Figure 1:
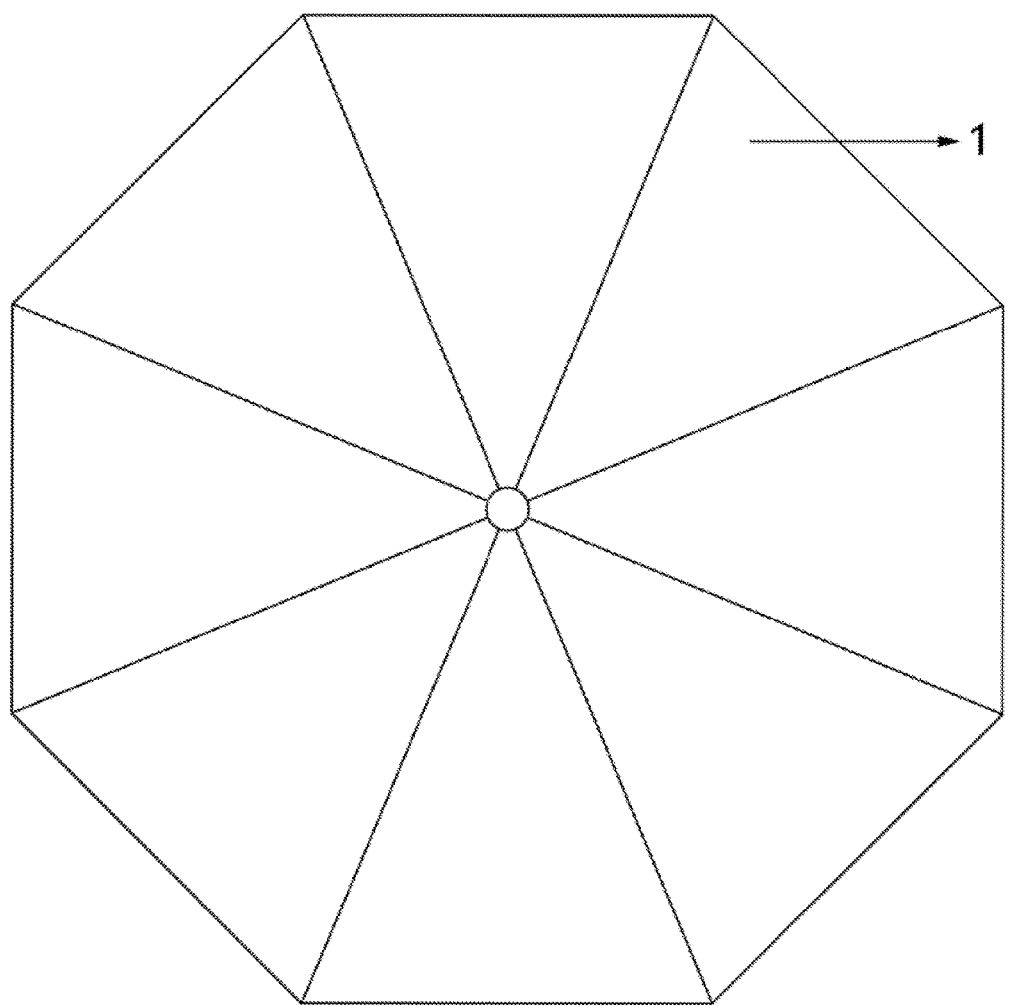
FIG. 1 depicts the transparent film (1) being applied to the structure of the sunshade.

As depicted in FIG. 1, this film is stitched into sections, like conventional fabric for this type of sunshade.

Given that the purpose of the invention is to provide the user protection against the harmful effects of the sun—in the form of ultraviolet radiation—while allowing that person to enjoy the sun and its warmth, it is necessary to replace traditional fabric with a material that had filtration features or features for the absorption of ultraviolet rays.

Figure 3:
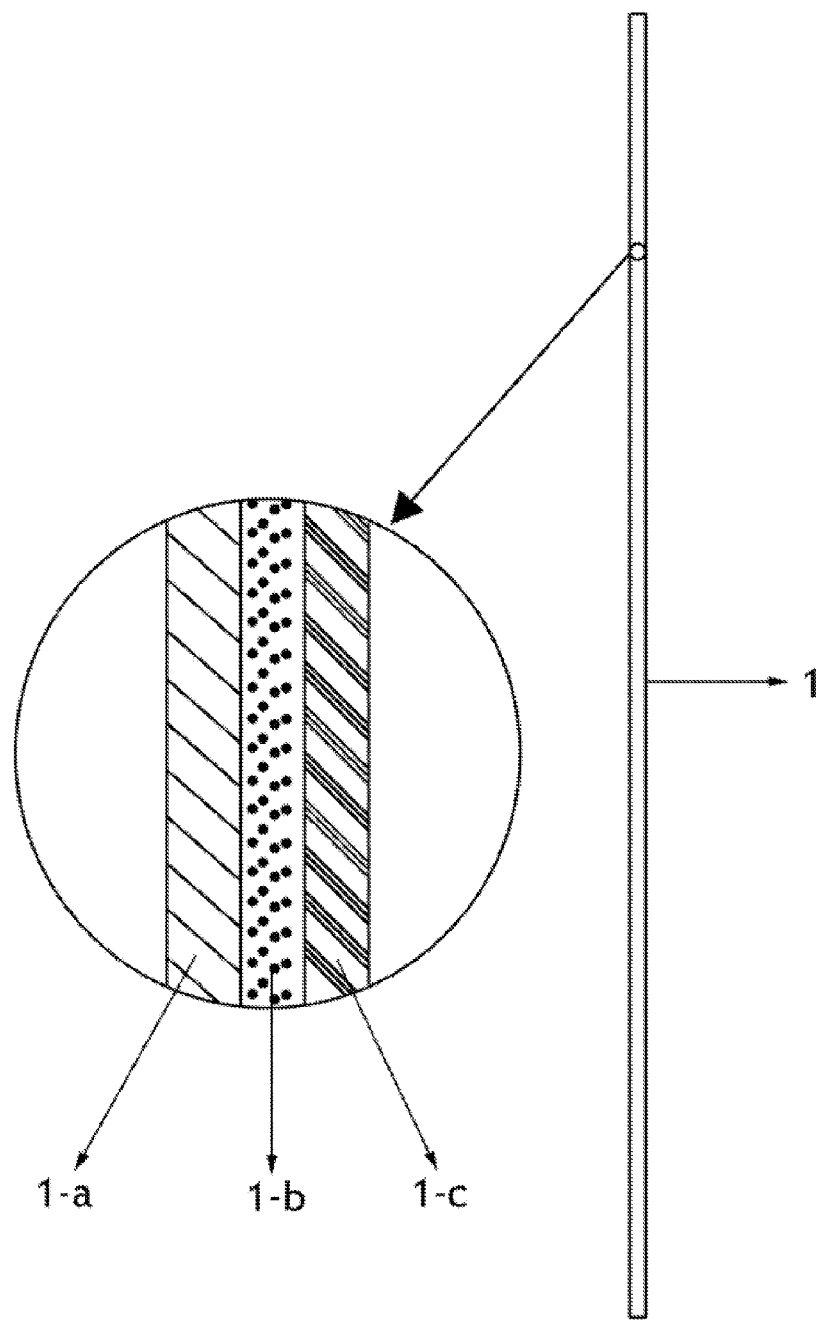
FIG. 3 shows a detailed, cross section of the film (1) having three layers consisting of: outer layers (1-a) and (1-c) comprised of polyethylene, and a core layer (1-b) comprised of a copolymer (Ethylene Vinyl Acetate, commonly known as EVA.

There are many products and substances on the market capable of significantly reducing, either by filtration or absorption, the impact of ultraviolet rays. The solution is to use a film composed of three layers of polymers (FIG. 3). This film is obtained through a process of co-extruding that combines three layers of different polymers into a single film. The three layers must have a transparency of greater than ninety percent.

The exterior layers of the film, (1-a) and (1-c), are polyethylene. This is responsible for preventing the viscosity of the film. The core layer (1-b) is a copolymer (Ethylene Vinyl Acetate), commonly known as EVA, and is responsible for the film's elasticity and absorption of infrared radiation. The ethyl vinyl acetate copolymer comprises 18% vinyl acetate, and allows less than one percent of ultraviolet rays to pass through the core layer. This copolymer is well known, and permits a wide variety of applications, being light and easily shaped (with "memory effect").

Added to all layers of the film are additives of the HALS type (Amines sterically blocked), which are used as stabilizers against UV radiation and its absorption, and benzophenone, one of the most widely used sunscreens. The greater or lesser amount of additives will determine the greater or lesser protection against ultraviolet radiation (the well known "protective factors" of sunscreens). This solution allows the possibility of using—and not just on the beach—sun shade type devices with different degrees or types of protection, making it possible, for example, to choose a device with protection factor X or Y. However, the amines sterically blocked should have an ultraviolet protection rating of greater than eighty, according to the European standard ultraviolet index. The invention meets the requirements of the European UV Standard 801 protection.

As a result of the application of the three layers in the film (1), the film would exhibit the following features, in summary:

Transparency (or translucency), which allows the passage of sunlight and its warmth;
Flexibility (which facilitates its sewing and placement on the structure of the sunshade);
Protection against ultraviolet radiation, and this protection may be more or less intense.
The film obtained by the three layers of polymers allows one to obtain a transparency of 90%."
The EVA copolymer has 18% of vinyl acetate.
In the invention, less than 1% UV rays go through the three layers of film.

What is claimed:

1. A beach umbrella translucent to sunlight while filtering out ultraviolet rays, wherein the canopy consists of a transparent film consisting of:
   three layers of copolymers joined by co-extruding the copolymers in one film, the three layers having a transparency of greater than ninety percent;
   a first layer and a third layer forming opposing exterior layers made of polyethylene;
   a second, intermediary layer, is made of an ethyl vinyl acetate copolymer having 18% vinyl acetate, and allowing less than one percent of ultraviolet rays to pass through the intermediate layer; and
   the three layers further consisting of additives of amines sterically blocked and benzophenone, the amines sterically blocked having an ultraviolet protection rating of greater than eighty according to the European standard ultraviolet index.

\* \* \* \* \*